(12) United States Patent
Reitsma et al.

(10) Patent No.: US 10,277,567 B2
(45) Date of Patent: Apr. 30, 2019

(54) METHOD AND SERVER FOR ISSUING CRYPTOGRAPHIC KEYS TO COMMUNICATION DEVICES

(71) Applicant: MOTOROLA SOLUTIONS, INC., Schaumburg, IL (US)

(72) Inventors: Katrin Reitsma, Chicago, IL (US); Michael F. Korus, Eden Prairie, MN (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 156 days.

(21) Appl. No.: 15/174,762

(22) Filed: Jun. 6, 2016

(65) Prior Publication Data
US 2017/0353438 A1 Dec. 7, 2017

(51) Int. Cl.
*H04L 9/08* (2006.01)
*H04L 29/06* (2006.01)

(52) U.S. Cl.
CPC .......... *H04L 63/065* (2013.01); *H04L 63/061* (2013.01); *H04L 63/068* (2013.01); *H04L 63/1433* (2013.01)

(58) Field of Classification Search
CPC ............ H04L 9/08; H04L 63/08; H04L 63/10
See application file for complete search history.

(56) References Cited

U.S. PATENT DOCUMENTS

| | | |
|---|---|---|
| 6,782,103 B1 | 8/2004 | Arthan et al. |
| RE43,934 E | 1/2013 | Smith |

(Continued)

FOREIGN PATENT DOCUMENTS

| | | |
|---|---|---|
| EP | 1109351 | 6/2001 |
| JP | 2011523513 | 8/2011 |

(Continued)

OTHER PUBLICATIONS

Groves, "Elliptic Curve-Based Certificateless Signatures for Identity-Based Encryption (ECCSI)," memo RFC 6507, Feb. 2012, pp. 1-17, ISSN:2070-1721.

(Continued)

*Primary Examiner* — Izunna Okeke
(74) *Attorney, Agent, or Firm* — Michael Best & Friedrich LLP

(57) ABSTRACT

Method and server for issuing a cryptographic key. One method includes distributing a first group key to a first communication device and a second communication device. The method also includes distributing a security request to the first communication device. The method further includes receiving a security status from the first communication device responsive to transmitting the security request. The method also includes determining when security of the first communication device is compromised based on the security status. The method further includes distributing, via a server, the cryptographic key to the first communication device when the security of the first communication device is not compromised. The method also includes distributing, via the server, a second group key to the second communication device when the security of the first communication device is compromised and the first communication device cannot be fixed or deactivated.

18 Claims, 4 Drawing Sheets

(56) References Cited

U.S. PATENT DOCUMENTS

| | | | |
|---|---|---|---|
| 8,458,462 B1* | 6/2013 | Hanna | H04L 63/10 713/156 |
| 9,300,473 B2 | 3/2016 | Nix | |
| 2003/0126433 A1 | 7/2003 | Hui | |
| 2004/0111636 A1 | 6/2004 | Baffes et al. | |
| 2006/0093150 A1 | 5/2006 | Reddy et al. | |
| 2008/0162589 A1 | 7/2008 | Rodeheffer et al. | |
| 2008/0232595 A1 | 9/2008 | Pietrowicz et al. | |
| 2010/0014677 A1 | 1/2010 | Sato et al. | |
| 2010/0153713 A1 | 6/2010 | Klein | |
| 2010/0329463 A1 | 12/2010 | Ratliff et al. | |
| 2013/0073860 A1 | 3/2013 | Ibraimi et al. | |
| 2013/0124870 A1 | 5/2013 | Rosati et al. | |
| 2014/0095883 A1 | 4/2014 | Kirillov et al. | |
| 2016/0034693 A1 | 2/2016 | Takeuchi | |
| 2017/0353308 A1 | 12/2017 | Reitsma et al. | |
| 2017/0353455 A1 | 12/2017 | Kruegel et al. | |

FOREIGN PATENT DOCUMENTS

| | | |
|---|---|---|
| WO | 2004032416 | 4/2004 |
| WO | 2008115988 | 9/2008 |
| WO | 2009017984 | 2/2009 |
| WO | 2010033353 | 3/2010 |

OTHER PUBLICATIONS

Groves, "Sakai-Kasahara Key Encryption (SAKKE)," memo RFC 6508, Feb. 2012, pp. 1-21, ISSN:2070-1721.

Groves, "Mikey-Sakke: Sakai-Kasahara Key Encryption in Multimedia Internet KEYing (MIKEY)," memo RFC 6509, Feb. 2012, pp. 1-21, ISSN:2070-1721.

3GPP TS 33.179, 3rd Generation Partnership Project; Technical Specification Group Services and System Aspects; Security of Mission Critical Push to Talk (MCPTT), technical specification, Mar. 2016, pp. 1-77, V1.1.0.

3GPP TS 33.303, "3rd Generation Partnership Project; Technical Specification Group Services and System Aspects; Proximity-based Services (ProSe); Security aspects," technical specification, Mar. 2016, pp. 1-88, V13.3.0.

3GPP TR 33.879 "3rd Generation Partnership Project;Technical Specification Group Services and System Aspects; Study on security enhancements for Mission Critical Push to Talk (MCPTT) over LTE," technical specification, Mar. 2016, pp. 1-86, V13.0.0.

GB1708218.1 Combined Search and Examination Report dated Oct. 27, 2017 (7 pages).

3GPP TS 33.179, 3rd Generation Partnership Project; Technical Specification Group Services and System Aspects; Security of Mission Critical Push to Talk (MCPTT), technical specification, Feb. 2016, Release 13, pp. 1-77, V2.0.0.

PCT/US2017/032507 International Search Report and Written Opinion of the International Searching Authority dated Jul. 11, 2017 (17 pages).

GB1708181.9 Search Report dated Oct. 29, 2017 (5 pages).

Office Action from the US Patent and Trademark Office for U.S. Appl. No. 15/174,424 dated Feb. 22, 2018 (14 pages).

Office Action from the US Patent and Trademark Office for U.S. Appl. No. 15/174,424 dated Aug. 6, 2018 (10 pages).

Office Action from the US Patent and Trademark Office for U.S. Appl. No. 15/174,816 dated Jul. 5, 2018 (14 pages).

Office Action from the U.S. Patent and Trademark Office for U.S. Appl. No. 15/174,424 dated Feb. 21, 2019 (11 pages).

* cited by examiner

METHOD AND SERVER FOR ISSUING CRYPTOGRAPHIC KEYS TO COMMUNICATION DEVICES

BACKGROUND OF THE INVENTION

The 3$^{rd}$ Generation Partnership Project (3GPP) is standardizing Sakai-Kasahara Key Encryption in Multimedia Internet KEYing (MIKEY-SAKKE) for communication devices that communicate in accordance with the 33.179 Security of Mission Critical Push-To-Talk (MCPTT) specification. MIKEY-SAKKE and other key management schemes often rely on periodic key renewal to enhance security. However, many key management schemes do not include mechanisms for handling security compromised communication devices. As a result, new keys may be issued to security compromised communication devices during scheduled key renewal periods.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
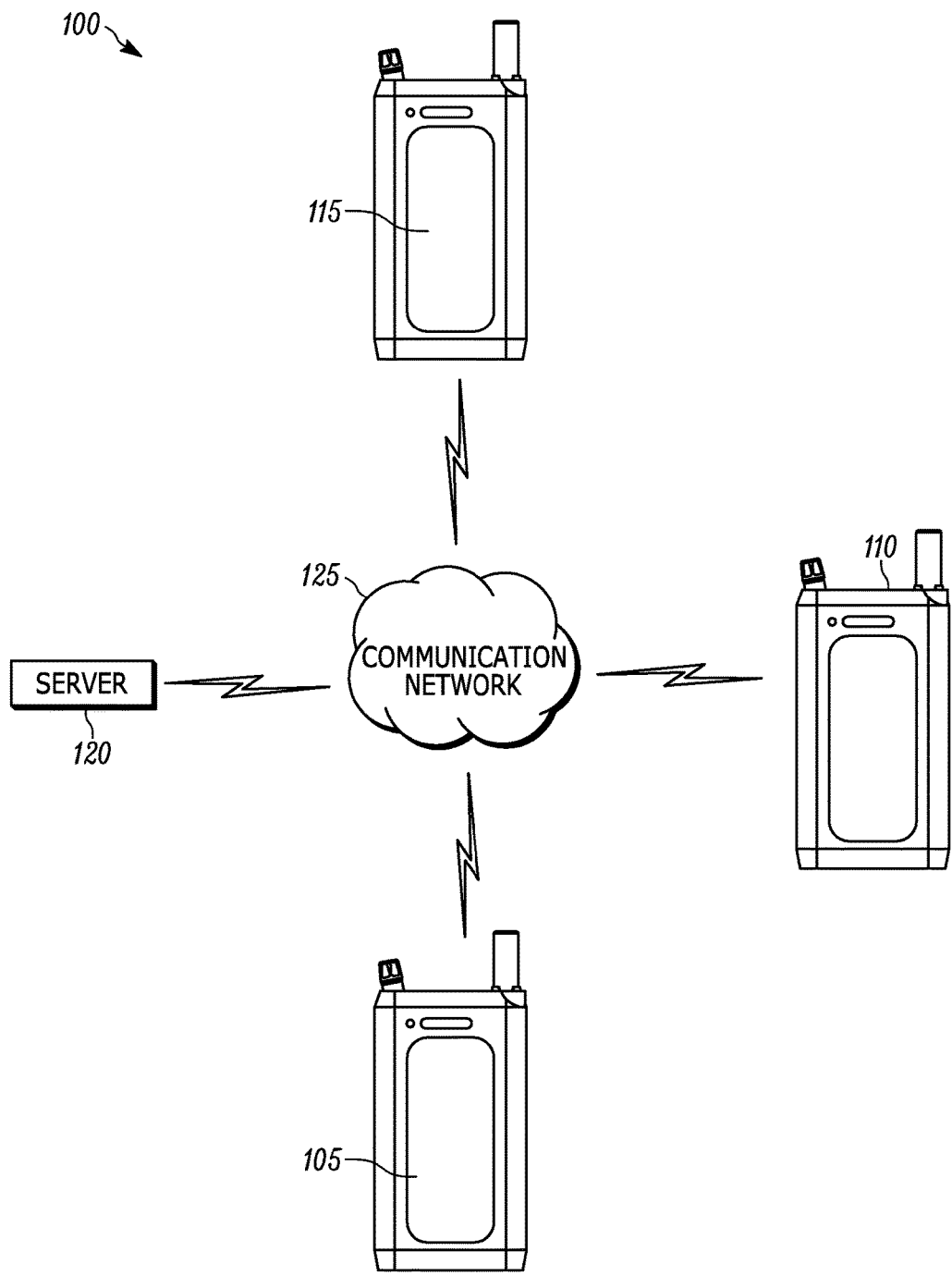
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of issuing a cryptographic key. In one example, the method includes distributing, via a server, a first group key to a first communication device and a second communication device. The method also includes distributing, via the server, a security request to the first communication device. The method further includes, responsive to transmitting the security request, receiving, at the server, a security status from the first communication device. The method also includes determining, with the server, when security of the first communication device is compromised based on the security status. The method further includes distributing, via the server, the cryptographic private key to the first communication device when the security of the first communication device is not compromised. The method also includes distributing, via the server, a second group key to the second communication device when the security of the first communication device is compromised and the first communication device cannot be fixed or deactivated.

Another embodiment provides a server. In one example, the server includes a transceiver and an electronic processor. The electronic processor is electrically coupled to the transceiver. The electronic processor is configured to distribute, via the transceiver, a security request to a first communication device. The first communication device includes a first group key. The electronic processor is also configured to receive, via the transceiver, a security status from the first communication device responsive to transmitting the security request. The electronic processor is further configured to determine when security of the first communication device is compromised based on the security status. The electronic processor is also configured to distribute, via the transceiver, a cryptographic private key to the first communication device when the security of the first communication device is not compromised. The electronic processor is further configured to distribute, via the transceiver, a second group key to a second communication device when the security of the first communication device is compromised and the first communication device cannot be fixed or deactivated. The second communication device includes the first group key.

FIG. 1 is a diagram of a communication system 100 according to one embodiment. The communication system 100 includes a first communication device 105, a second communication device 110, a third communication device 115, and a server 120. The first communication device 105, the second communication device 110, the third communication device 115, and the server 120 communicate over a communication network 125. In some embodiments, the communication network 125 operates according to the Public Safety Long Term Evolution (LTE) communication protocol. In alternate embodiments, the communication network 125 operates using other wireless or wired communication protocols including, but not limited to, Terrestrial Trunked Radio (TETRA), Digital Mobile Radio (DMR), Project 25 (P25), 5G, Wi-Fi, Bluetooth®, cable, Ethernet, and satellite. The communication system 100 illustrated in FIG. 1 is provided as one example of such a system. The methods described herein may be used with communication systems with fewer, additional, or different components in different configurations than the communication system 100 illustrated in FIG. 1. For example, in some embodiments, the communication system 100 includes fewer or additional servers and may include fewer or additional communication devices.

The communication devices 105, 110, 115 may be devices capable of communicating over the communication network 125. As illustrated in FIG. 1, the communication devices 105, 110, 115 may be handheld or portable devices, such as smart telephones, portable radios, and tablet computers. In some embodiments, the communication devices 105, 110, 115 are portable two-way radios carried by public safety personnel, such as police officers.

A cryptographic key is assigned to each communication device. As used herein, the term "cryptographic key," may refer to a private key (for example, in a public key scheme), an identity-based private key (for example, in an identity-based scheme), and a secret key (for example, in a symmetric scheme). Also, as used herein, the term "key," may refer to a single key, a plurality of keys, a single key pair, a plurality of key pairs, or any combination thereof. In some embodiments, multiple cryptographic keys or key pairs are assigned to each communication device (for example, one cryptographic key pair for signing/verifying and one cryptographic key pair for encrypting/decrypting). As described below, cryptographic keys enable secure point-to-point communication and group communication between the communication devices.

As an example, the first communication device 105 and the second communication device 110 may each include cryptographic keys. In some embodiments, the second communication device 110 encrypts a communication destined for the first communication device 105 using the cryptographic key of the first communication device 105. In alternate embodiments, the second communication device 110 encrypts a communication destined for the first communication device 105 using a pairwise session key that is derived using a key establishment protocol based on the cryptographic keys of the first communication device 105 and the second communication device 110. The encrypted communication is transmitted by the second communication device 110 to the first communication device 105 (for example, via the communication network 125). The first communication device 105 decrypts the encrypted communication from the second communication device 110 using its cryptographic key or the pairwise session key.

In some embodiments, the communication devices 105, 110, 115 are members of one or more talk groups. As used herein, the term "talk group," may refer to a virtual radio channel (for example, a frequency channel) that is used for communication between a group of communication devices. A group key is associated with each talk group. The group key is common across all members of a talk group. In some embodiments, a group key includes a symmetric group key. As described below, a group key enables secure communication between members of a talk group.

As an example, the first communication device 105, the second communication device 110, and the third communication device 115 may each include a first group key. The second communication device 110 encrypts a message destined to a first talk group (including, for example, the first communication device 105, the second communication device 110, and the third communication device 115) with the first group key. The encrypted communication is transmitted by the second communication device 110 to each communication device in the first talk group (for example, via the communication network 125). The first communication device 105 and the third communication device 115 decrypt the encrypted communication from the second communication device 110 using the first group key.

Figure 2:
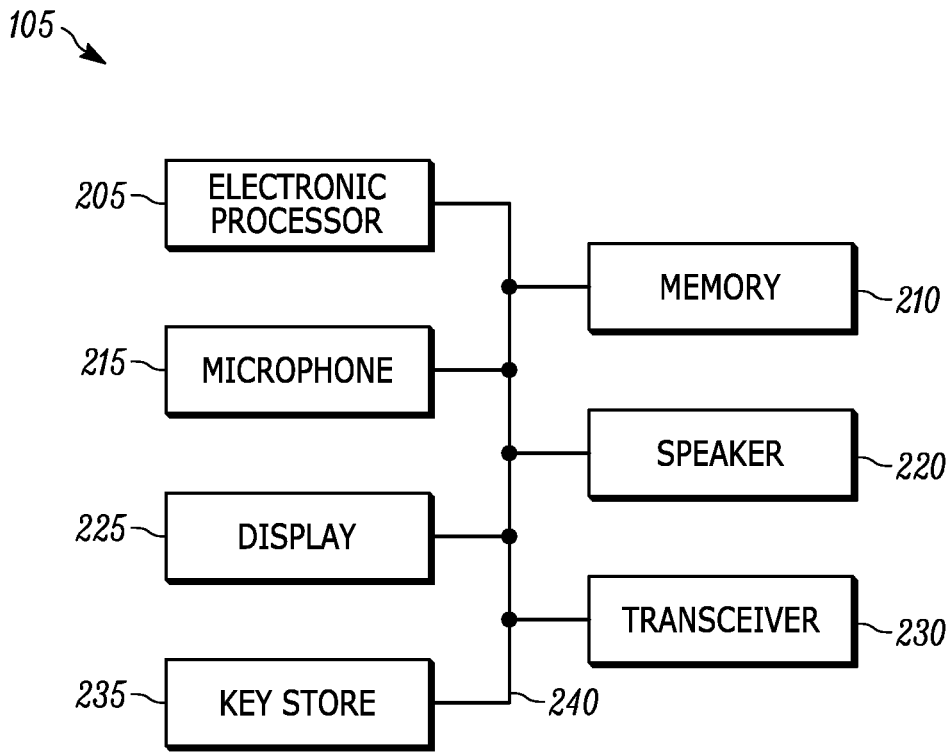
FIG. 2 is a diagram of a communication device included in the communication system of FIG. 1 in accordance with some embodiments.

FIG. 2 is a diagram of the first communication device 105 according to one embodiment. As illustrated in FIG. 2, the first communication device 105 may include an electronic processor 205, memory 210, a microphone 215, a speaker 220, a display 225, a transceiver 230, and a key store 235. The electronic processor 205, the memory 210, the microphone 215, the speaker 220, the display 225, the transceiver 230, and the key store 235 are connected to each other through one or more conductors or links such as a bus 240. In alternate embodiments, the first communication device 105 may include fewer or additional components in configurations different from the configuration illustrated in FIG. 2.

In some embodiments, the electronic processor 205 includes a primary electronic processor and a secondary electronic processor (for example, a separate secure electronic processor, a subscriber identification module (SIM) card electronic processor, a trusted platform module (TPM), and the like). The memory 210 stores instructions and data. The memory 210 may include combinations of different types of memory, such as read only memory (ROM), random access memory (RAM), and other memory. The electronic processor 205 retrieves instructions from the memory 210 and executes the instructions to perform a set of functions including the methods described herein.

The microphone 215 detects sound and outputs analogous electric signals representing the sound to the electronic processor 205. The speaker 220 receives electric signals from the electronic processor 205 and outputs sound.

The display 225 provides a visual output (for example, graphical indicators, lights, colors, text, images, combinations of the foregoing, and the like) regarding a status of the first communication device 105. The display 225 includes a suitable display mechanism for displaying the visual output (for example, a light-emitting diode (LED) screen, a liquid crystal display (LCD) screen, or the like).

The transceiver 230 transmits signals to the communication network 125 and receives signals from the communication network 125. Signals may include, for example, audio data, security statuses, and data packets. In some embodiments, the transceiver 230 includes a separate transmitter and receiver.

The key store 235 securely stores keys (for example, cryptographic keys and group keys) within the first communication device 105. The key store 235 provides different levels of security to protect the keys (for example, from extraction) based on the manner in which the key store 235 is constructed. Key extraction occurs when a key or a copy of a key is moved outside of the device storing the key. As an example, malware on the communication device or a remote attacker access a key stored on the communication device and send it over a network connection to a remote server. Similarly, said malware or remote attacker may store a copy of the key to a removable memory on the communication device or share the key via email, text message, instant message, or any other form of communication link such that a copy of the key exists outside the communication device. In some embodiments, the key store 235 includes a level of security sufficient to prevent keys from being extracted from the key store 235. For example, the key store 235 may comply with the Federal Information Processing Standard Publication 140-2 Level-3 protection. As an example, the key store 235 may include a CRYPTR micro encryption unit by Motorola Solutions. In alternate embodiments, the key store 235 may not include a level of security sufficient to prevent keys from being extracted from the key store 235.

In some embodiments, the second communication device 110 and the third communication device 115 may include components or combinations of different components, including all or some of the various components described above with respect to the first communication device 105.

Figure 3:
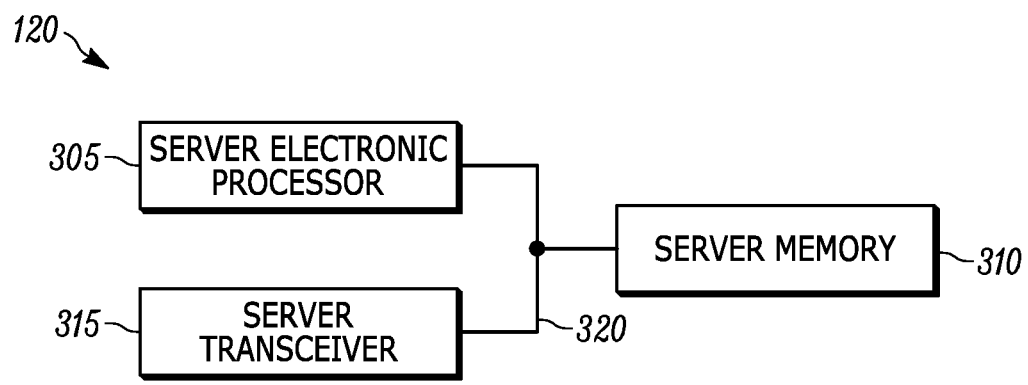
FIG. 3 is a diagram of a server included in the communication system of FIG. 1 in accordance with some embodiments.

FIG. 3 is a diagram of the server 120 according to one embodiment. In the example illustrated, the server 120 may include a server electronic processor 305, server memory 310, and a server transceiver 315. The server electronic processor 305, the server memory 310, and the server transceiver 315 are connected to each other through one or more conductors or links such as a server bus 320. In other embodiments, the server 120 may include fewer or additional components in configurations different from the configuration illustrated in FIG. 3. In some embodiments, the server 120 is a key management server. In alternate embodiments, the server 120 is a mobile device management server. In alternate embodiments, the server 120 is both a key management server and a mobile device management server.

The server memory 310 stores instructions and data. The server memory 310 may include combinations of different types of memory, including the various types of memory described above with respect to the memory 210. The server electronic processor 305 retrieves instructions from the server memory 310 and executes the instructions to perform a set of functions including the methods described herein. The server transceiver 315 transmits signals to and receives signals from the first communication device 105, such as through the communication network 125 or directly. Signals may include, for example, audio data, security requests, cryptographic private keys, group keys, alert signals, and data packets.

There are many ways in which the security of a communication device may become compromised. In general, a communication device is compromised when it contains malware, has been rooted (for example, restrictions removed to allow access to low-level functions), the integrity of protected files or file partitions have been compromised or has detected key-tampering. A compromised communication device is obviously affected by a security breach. However, other communication devices may also be affected. As an example, a compromised communication device may compromise the security of other communication devices which belong to the same talk groups as the compromised communication device.

Many key management schemes rely on periodic key renewal for implicit key revocation. In other words, keys are not revoked when a compromise has been detected but automatically expire at the end of their current validity interval. However, many key management schemes do not include mechanisms for ensuring that new keys are only issued to communication devices that have not been compromised. Thus, compromised communication devices will continue to receive new keys during scheduled key updates. To prevent compromised communication devices from receiving new keys during scheduled key updates, it is necessary to detect when a communication device is compromised.

Figure 4:
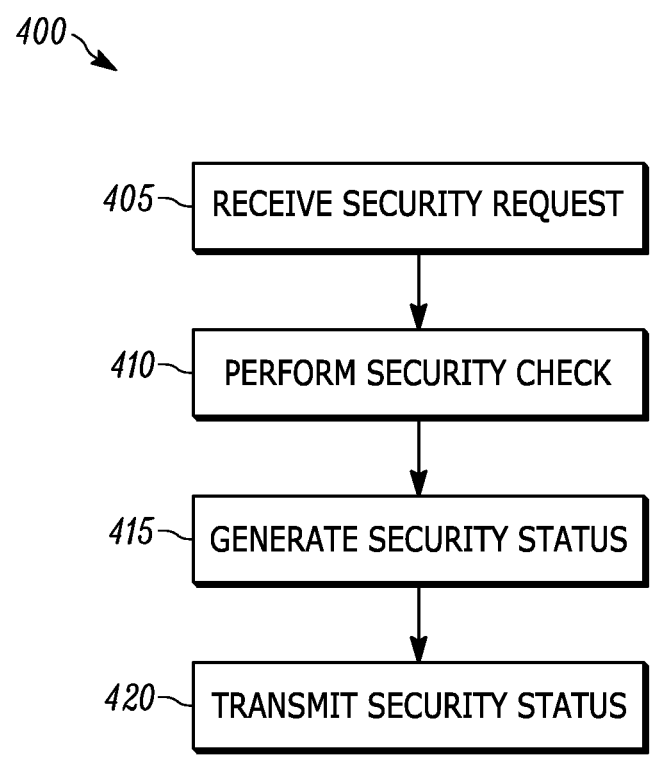
FIG. 4 is a flowchart of a method of determining and reporting when the security of a communication device is compromised in accordance with some embodiments.

The first communication device 105 determines when its security is compromised and reports it to the server 120. For example, in some embodiments, the first communication device 105, or more particularly, the electronic processor 205 executing instructions, may perform the method 400 illustrated in FIG. 4 to determine and report when the security of the first communication device 105 is compromised. The method 400 is described in terms of the communication system 100 illustrated in FIG. 1 to provide one example. The method 400 may be applied to other communication systems and is not limited to the communication system 100 illustrated in FIG. 1.

In the example illustrated, the method 400 includes the first communication device 105 receiving a security request, for example, from the server 120 (at block 405). Responsive to receiving the security request, the first communication device 105 performs a security check (at block 410). In some embodiments, the first communication device 105 determines when it had been rooted. As an example, the first communication device 105 determines that it has been rooted when a process runs at a privilege level higher than a defined level. In other embodiments, the first communication device 105 determines when a system image on the first communication device 105 has been altered. Generally, the system image on the first communication device 105 should be read-only. If the system image is not read-only (for example, writable), the security of the first communication device 105 may be compromised. In other embodiments, the first communication device 105 determines when a protected file or file partitions (for example, read-only) on the first communication device 105 has been altered. In other embodiments, the first communication device 105 determines when any of the keys (for example, cryptographic keys and group keys) stored in the key store 235 have been extracted or tampered with.

In performing the security check, the first communication device 105 determines when the security of the first communication device 105 is compromised. In some embodiments, the first communication device 105 determines that its security has been compromised when any of the above described conditions are detected during the security check. As an example, the first communication device 105 determines that its security is compromised when it is rooted, when malware is detected, or when key-tampering is detected.

After performing the security check, the first communication device 105 generates a security status (at block 415) using the electronic processor 205. The security status may include, for example, a user identifier, a device identifier, a device status, a time stamp, key storage information, or any combination thereof. The user identifier identifies a user of the first communication device 105. The device identifier identifies a specific communication device as opposed to a user of the communication device. As an example, the first and third communication devices 105, 115 may both include the same user identifier but different device identifiers. The device status indicates when the security of the communication device is compromised. In some embodiments, the device status may include information about how the security of the first communication device 105 is compromised. The time stamp provides authentication of a genuine security status.

The key storage information includes information regarding the storage of keys in the first communication device 105. In some embodiments, the key storage information includes information regarding the key store 235 (for example, a model number of the key store 235). As an example, the key storage data may indicate that the key store 235 includes a CRYPTR micro encryption unit. In some embodiments, the key storage information indicates a defined standard of security that the key store 235 complies with. As an example, the key storage information may indicate that the key store 235 complies with the Federal Information Processing Standard Publication 140-2 Level-3 protection.

After generating the security status, the first communication device 105 transmits the security status to the server 120 (at block 420). In some embodiments, the first communication device 105 establishes a secure connection to the server 120 over which the security status is sent. For example, the first communication device 105 may establish a direct connection with the server 120 and transmit the security status of the direction connection, instead of over the communication network 125. In some embodiments, the secure tunnel terminates in a secure enclave in the electronic processor 205 (for example, in a Virtual Machine, a separate operating system image, secure container, or separate secure element) on the first communication device 105.

In some embodiments, the security status is cryptographically protected to provide authentication and integrity protection such that the security status cannot be altered on the first communication device 105 (for example, by malware) or en route while being sent to the server 120. For example, in some embodiments, the first communication device 105 digitally signs the security status. In such embodiments, the digital signature is transmitted to the server 120 with the security status.

The server 120 performs key management functions to ensure that cryptographic private keys and group keys are not distributed to compromised communication devices. Key management schemes without explicit key revocation (for example, using certificate revocation lists) may use implicit key revocation such as periodic key renewal. With periodic key renewal, the server 120 performs scheduled updates of each of the cryptographic keys and the group keys. As an example, in some embodiments, scheduled updates occur once a month. In some embodiments, the scheduled updates of cryptographic keys and group keys occur at the same time. In alternate embodiments, the scheduled updates of cryptographic keys and group keys occur at different times. As an example, the server 120 may perform scheduled updates of cryptographic keys on the first day of every month and perform scheduled updates of group keys on the fifth day of every month.

Figure 5:
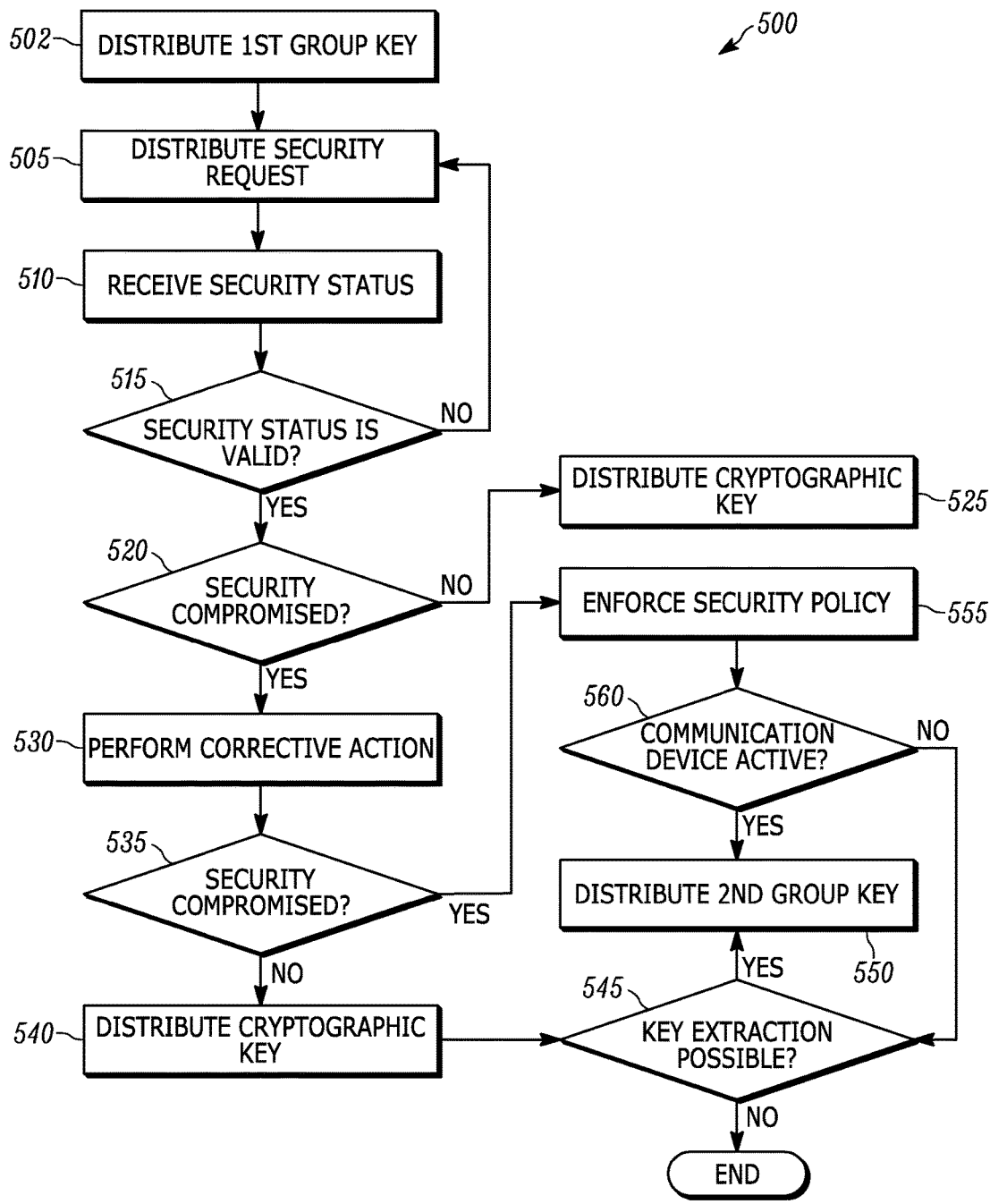
FIG. 5 is a flowchart of a method of issuing a cryptographic key performed by the communication system of FIG. 1 in accordance with some embodiments.

During a scheduled update of cryptographic keys, the server 120 identifies compromised communication devices and only issues new cryptographic keys to non-compromised communication devices. For example, in some embodiments, the server 120, or more particularly, the server electronic processor 305 executing instructions, may perform the method 500 illustrated in FIG. 5 to issue new cryptographic keys. The method 500 is described in terms of the communication system 100 illustrated in FIG. 1 to provide one example. The method 500 may be applied to other communication systems and is not limited to the communication system 100 illustrated in FIG. 1.

In the example illustrated, the method 500 includes the server 120 distributing a first group key to the first communication device 105, the second communication device 110, and the third communication device 115 (at block 502). The method 500 also includes the server 120 distributing a security request to the first communication device 105 (at block 505). As described above, the first communication device 105 performs a security check to determine when its security is compromised in response to receiving a security request. After performing the security check, the first communication device 105 generates and distributes a security status to the server 120, for example, as described previously herein with respect to FIG. 4. Thus, responsive to transmitting the security request, the server 120 receives the security status from the first communication device 105 (at block 510).

Upon receiving the security status, the server 120 determines when the security status is valid (at block 515). As explained above, the first communication device 105 may digitally sign the security status. Thus, in some embodiments, the server 120 verifies the authenticity and integrity of the security status based on a digital signature that is transmitted with the security status. Also, as explained above, the security status may include a time stamp. In some embodiments, the server 120 verifies the authenticity and integrity of the security status based at least in part on the time stamp. In some embodiments, as in the example illustrated, the server 120 distributes a new security request (for example, a second security request) to the first communication device 105 when the security status is not valid. In some embodiments, the server 120 performs a corrective action, as described below, when the security status in not valid. As an example, the server 120 may perform the corrective action when multiple invalid security statuses are received from the same communication device over a defined period of time. In some embodiments, there is max number of attempts that the server 120 will make to receive a valid security status from the same communication device.

Upon verifying the validity of the security status, the server 120 determines when the security of the first communication device 105 is compromised based on the security status (at block 520). As described above, the security status includes a device status which indicates when the security of the first communication device 105 is compromised.

When the security of the first communication device 105 is not compromised, the server 120 distributes a new cryptographic private key to the first communication device 105 (at block 525). Alternatively, when the security of the first communication device 105 is compromised, the server 120 performs one or more corrective actions on the first communication device 105 to address the compromised security (at block 530). Corrective actions are attempts to fix the security of a compromised communication device. A communication device is fixed when its security is changed from a compromised state to an uncompromised state. Corrective actions may include, for example, resetting a compromised communication device and uninstalling an unwanted programs on a compromised communication device (for example, malware). In some embodiments, a compromised communication device cannot be fixed (for example, by corrective actions). As an example, the server 120 may be unable to uninstall malware that is present on the first communication device 105.

After performing the corrective action, the server 120 determines when the security of the first communication device 105 is still compromised (at block 535). As an example, the server 120 may distribute a second security request to the first communication device 105 and determine when the security of the first communication device 105 is still compromised based on a second security status which the server 120 receives from the first communication device 105. When the security of the first communication device 105 is no longer compromised, the server 120 distributes the new cryptographic key to the first communication device 105 (at block 540).

After distributing the new cryptographic key to the first communication device 105 (at block 540), the server 120 determines when key extraction is possible on the first communication device 105 (at block 545). In some embodiments, the server 120 makes this determination based on the key storage information included in the security status. As explained above, the key storage information includes information regarding the storage of keys (for example, the first group key, and the cryptographic key) in the first communication device 105 (for example, information about the key store 235). The key storage information may further indicate that the key store 235 includes a level of security sufficient to prevent keys from being extracted from the key store 235. As an example, the server 120 may determine that key extraction is not possible from the key store 235 when the key storage information indicates that the key store 235 complies with the Federal Information Processing Standard Publication 140-2 Level-3 protection.

When key extraction is possible on the first communication device 105, the server 120 distributes updated group keys to non-compromised communication devices that are members of the same talk groups as the first communication device 105 (at block 550). As an example, the server 120 may distribute a second group key to the second communication device 110 and the third communication device 115 (assuming that both of these communication devices are not security compromised). Alternately, when the key extraction is not possible on the first communication device 105, the method 500 may end (at block 552).

Returning to block 535, when the security of the first communication device 105 is still compromised after the corrective action is performed (for example, when the first communication device 105 cannot be fixed), the server 120 enforces a security policy on the first communication device 105 (at block 555). The server 120 attempts to deactivate a first communication device 105 by enforcing the security policy. In some embodiments, the server 120 disables functionality of the first communication device 105 when the security of the first communication device 105 is still compromised. In alternate embodiments, the server 120 erases (or zeroizes (for example, sets or resets all variables to zero)) the keys (for example, the cryptographic key and the first group key) stored in the key store 235 of the first communication device 105. In some embodiments, the server 120 receives a confirmation from the first communication device 105 when the keys have been erased from the key store 235. In yet another embodiment, the server 120 completely disables (or bricks) the first communication device 105. In some embodiments, the first communication device 105 cannot be deactivated. For example, malware present on the first communication device 105 may prevent the server's 120 attempts to deactivate the first communication device 105.

After enforcing the security policy, the server 120 determines when the first communication device 105 is still active (at block 560). As described above, the server 120 may disable the first communication device 105 when its security is compromised. In some embodiments, the server 120 determines when the first communication device 105 is still active a predetermined amount of time after the disabling attempt. The server 120 may make this determination by, for example, monitoring communications between the communication devices to see if the first communication device 105 is still transmitting messages. When the first communication device 105 is still active (for example, when the first communication device 105 cannot be deactivated), the server 120 distributes the updated group key (for example, the second group) to non-compromised communication devices that are members of the same talk groups as the first communication device 105 (at block 550) as described above. Alternatively, when the first communication device 105 is not still active, the server 120 determines when key extraction is possible on the first communication device 105 (at block 545) as described above.

A user of a communication device (for example, the first communication device 105) may be unaware that their communication device is compromised. Thus, in some embodiments, the server 120 distributes an alert signal indicating that the security of a communication device is compromised. The server 120 may distribute the alert signal to the compromised communication device, at least one non-compromised communication device of the same user, or both. In some embodiments, the server 120 distributes the alert signal after distributing the updated group key (at block 550). Upon receiving the alert signal, a communication device may generate a visual or audible alert. As an example, upon receiving an alert signal, the first communication device 105 may display a visual alert on the display 225 and produce an audible alert via the speaker 220. The visual and/or audible alert may indicate that the security of the communication device is compromised. In some embodiments, the alert may further indicate when another communication device of the user (for example, a non-compromised communication device) is available. As an example, the first communication device 105 and the third communication device 115 may be associated with the same user. Thus, when the security of the first communication device 105 is compromised, the server 120 may distribute an alert signal to the third communication device 115 indicating that the security of the first communication device 105 is compromised and prompting the user to change to the third communication device 115.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of issuing a cryptographic private key, the method comprising:
   distributing, via a server, a first group key to a first communication device and a second communication device;
   distributing, via the server, a security request to the first communication device;
   responsive to transmitting the security request, receiving, at the server, a security status from the first communication device;
   determining, with the server, when security of the first communication device is compromised based on the security status;
   distributing, via the server, the cryptographic private key to the first communication device when the security of the first communication device is not compromised;
   performing, with the server, a corrective action on the first communication device when the security of the first communication device is compromised; and
   distributing, via the server, a second group key to the second communication device when the security of the first communication device is compromised and the first communication device cannot be fixed or deactivated;
   wherein the first communication device cannot be fixed when the security of the first communication device is still compromised after the corrective action is performed.

2. The method of claim 1, further comprising distributing, via the server, the second group key to the second communication device when the security of the first communication device is compromised and key extraction is possible on the first communication device, wherein key extraction is possible on the first communication device when the first communication device does not include a level of security sufficient to prevent the first group key from being extracted from the first communication device.

3. The method of claim 2, wherein the security status includes key storage information of the first communication device, wherein the method further comprising determining, with the server, when key extraction is possible on the first communication device based on the key storage information.

4. The method of claim 1, wherein the security status is cryptographically protected to provide at least one selected from a group consisting of authentication and integrity protection.

5. The method of claim 4, wherein the security status includes a time stamp.

6. The method of claim 1, further comprising:
   disabling, with the server, functionality of the first communication device when the security of the first communication device is compromised; and
   transmitting, via-the server, the second group key to the second communication device when the security of the first communication device is compromised and the first communication device is active a predetermined amount of time after the disabling.

7. The method of claim 1, wherein the security request is a first security request, wherein the security status is a first security status, wherein the method further comprising:
   responsive to performing the corrective action, distributing, via the server, a second security request to the first communication device;
   responsive to transmitting the second security request, receiving, at the server, a second security status from the first communication device;
   determining, with the server, when the security of the first communication device is not compromised based on the second security status; and
   distributing, via the server, the cryptographic private key to the first communication device when the security of the first communication device is not compromised.

8. The method of claim 1, further comprising erasing, with the server, at least the first group key on the first communication device when the security of the first communication device is compromised.

9. The method of claim 1, wherein the first communication device and a third communication device are associated with a user, wherein the method further comprising distributing, via the server, an alert signal to the third communication device when the security of the first communication device is compromised, wherein the alert signal indicates that the security of the first communication device is compromised.

10. The method of claim 1, wherein the security request is a first security request, wherein the security status is a first security status, wherein the method further comprising:
- determining, with the server, when the first security status is valid; and
- distributing, via the server, a second security request to the first communication device when the first security status is not valid.

11. A server comprising:
a transceiver; and
an electronic processor electrically coupled to the transceiver and configured to:
- distribute, via the transceiver, a security request to a first communication device, the first communication device including a first group key,
- responsive to transmitting the security request, receive, via the transceiver, a security status from the first communication device,
- determine when security of the first communication device is compromised based on the security status,
- distribute, via the transceiver, a cryptographic private key to the first communication device when the security of the first communication device is not compromised,
- perform a corrective action on the first communication device when the security of the first communication device is compromised, and
- distribute, via the transceiver, a second group key to a second communication device when the security of the first communication device is compromised and the first communication device cannot be fixed or deactivated,
wherein the second communication device including the first group key, and wherein the first communication device cannot be fixed when the security of the first communication device is still compromised after the corrective action is performed.

12. The server of claim 11, wherein the electronic processor is further configured to
- distribute, via the transceiver, the second group key to the second communication device when the security of the first communication device is compromised and key extraction is possible on the first communication device, wherein key extraction is possible on the first communication device when the first communication device does not include a level of security sufficient to prevent the first group key from being extracted from the first communication device.

13. The server of claim 12, wherein the security status includes key storage information of the first communication device, wherein the electronic processor is further configured to determine when key extraction is possible on the first communication device based on the key storage information.

14. The server of claim 11, wherein the electronic processor is further configured to:
- disable functionality of the first communication device when the security of the first communication device is compromised, and
- transmit, via the transceiver, the second group key to the second communication device when the security of the first communication device is compromised and the first communication device is active a predetermined amount of time after the disabling.

15. The server of claim 11, wherein the security request is a first security request, wherein the security status is a first security status, wherein the electronic processor is further configured to:
- distribute, via the transceiver, a second security request to the first communication device responsive to performing the corrective action,
- receive, via the transceiver, a second security status from the first communication device responsive to transmitting the second security request,
- determine when the security of the first communication device is not compromised based on the second security status, and
- distribute, via the transceiver, the cryptographic private key to the first communication device when the security of the first communication device is not compromised.

16. The server of claim 11, wherein the electronic processor is further configured to erase the first group key on the first communication device when the security of the first communication device is compromised.

17. The server of claim 11, wherein the first communication device and a third communication device are associated with a user, wherein the electronic processor is further configured to distribute, via the transceiver, an alert signal to the third communication device when the security of the first communication device is compromised, wherein the alert signal indicates that the security of the first communication device is compromised.

18. The server of claim 11, wherein the security request is a first security request, wherein the security status is a first security status, wherein the electronic processor is further configured to:
- determine when the first security status is valid, and
- distribute, via the transceiver, a second security request to the first communication device when the first security status is not valid.

* * * * *